United States Patent [19]
Kors et al.

[11] 3,831,448
[45] Aug. 27, 1974

[54] MANOMETER AND PITOT TUBE PROBE

[76] Inventors: Vernon E. Kors, 28660 Millbrook, Farmington; Lawrence Leadbitter, 30698 Harlincin, Franklin, both of Mich. 48076

[22] Filed: Feb. 15, 1973

[21] Appl. No.: 332,706

Related U.S. Application Data

[63] Continuation-in-part of Ser. No. 180,744, Sept. 15, 1971, abandoned.

[52] U.S. Cl. .................................. 73/212, 73/401
[51] Int. Cl. ............................................. G01f 1/00
[58] Field of Search ............. 73/211, 212, 401, 213

[56] References Cited
UNITED STATES PATENTS

| | | | |
|---|---|---|---|
| 2,499,917 | 3/1950 | Harper | 73/211 |
| 3,605,495 | 9/1971 | Krause et al. | 73/212 |
| 3,678,754 | 7/1972 | Amir et al. | 73/212 |

*Primary Examiner*—Donald O. Woodiel
*Attorney, Agent, or Firm*—Weiner, Basile and Weintraub

[57] ABSTRACT

A manometer for measuring the velocity pressure of a fluid at selected positions along the length and cross section of a conduit or system of conduits carrying the fluid. The manometer comprises an inverted differential U-tube having a pair of downwardly extending legs, each leg of which is in fluid communication through control valves to a pitot tube probe selectively positioned within the conduit. The probe comprises an outer tubular member having a coaxially aligned inner tubular member carried by a plug enclosing the lower end of the outer tubular member. The lower end of the tubular member has a pair of diametrically opposed openings which respectively communicate via the probe plug with the annular space formed between the inner and outer tubular members and the interior of the inner tubular member. Valve means at selected locations along the length of the conduit permit the withdrawl and insertion of the pitot tube probe into the conduit without any fluid leaking therefrom.

One of the probe openings faces upstream to sense the total pressure of the fluid flowing through the conduit and communicates fluid at total pressure to one leg of the manometer while the other probe opening faces downstream to sense the static pressure of the fluid flowing through the conduit and communicates fluid at static pressure to the other leg of the manometer, wherein the difference in the height of the fluid in each leg of the manometer is indicative of the velocity pressure of the fluid within the conduit.

One leg of the manometer has an air supply tube with its upper end communicating with the upper interior of the U-tube while the lower end of the air supply tube is connected to a manually operated air supply pump. By pressurizing the air trapped with the inverted manometer with the air supply pump, any length of air column within the range of the manometer can be obtained to accommodate fluids at high pressure differentials without the possibility of the fluid in the high pressure leg spilling over the top of the U-tube and being exhuasted out the low pressure leg. A method of manufacturing the manometer probe is disclosed.

8 Claims, 7 Drawing Figures

PATENTED AUG 27 1974 3,831,448

PATENTED AUG 27 1974 3,831,448

MANOMETER AND PITOT TUBE PROBE

CROSS-REFERENCE TO RELATED APPLICATIONS

The present invention is a continuation-in-part of copending U.S. Pat. application Ser. No. 180,744 filed Sept. 15, 1971, now abandoned.

BACKGROUND OF THE INVENTION

I. Field of the Invention

The present invention relates to manometer systems and, in particular, to a pressurized manometer and a pitot tube probe for measuring the velocity pressures of a fluid in a conduit at various points along the cross section of the conduit and at selective locations along the length of the conduit.

II. Description of the Prior Art

Systems which include manometer gauges for measuring the pressure of a flowing fluid by the observation of the level of the fluid in a tube by reference to a predetermined graduated scale are well known to those skilled in the art of manometer systems. Such familiar gauges may comprise U-tubes, one end of which is connected to a reservoir fluid such as oil or mercury, while the other end is opened and connected to the system, the pressure of which is desired to be observed.

Normally, such manometers have a leg which communicates through a tube into the conduit carrying the fluid in such a manner that the gauge reading is not affected by the velocity of the flow, and this pressure is commonly referred to as the static pressure. A second tube may be placed in the fluid-carrying conduit with the second tube facing upstream to measure the pressure created by the impact of the flowing fluid in addition to the static pressure. This combined pressure is commonly referred to as the total pressure. It is evident that the difference between the static and total pressure at any given rate of flow will give directly the pressure due to impact, which is commonly referred to as the velocity pressure and from which the actual velocity of the fluid moving in the conduit may be calculated from conventionally available flow charts, all of which is well known to those skilled in the art.

Although many manometer systems are known, they are fragile and complex in design in order to achieve the accuracy needed for extensive field testing. In addition, most of the previously used manometer systems require the use of secondary manometer fluids which are difficult to use and easily affected by foreign particles in the fluid which create a poorly defined interface between the secondary manometer fluid and the fluid whose pressure is desired to be measured.

Several of the prior art inverted U-tube manometers are provided with a valve attached to the upper curved portion of the U-tube for selectively connecting the U-tube to a source of air pressure and thereby controlling the pressure of the air trapped within the inverted manometer. This arrangement requires a special glass fitting which can easily crack during fluid testing and is very expensive. In addition, many of the prior art manometers require special manifold blocks which in effect results in a split U-tube having many disadvantages including additional manufacturing expense, and difficulties are encountered in bleeding the U-tube due to the entrapment of air and/or fluid with the manifold, all of which results in inaccurate measurements.

It would therefore be desirable to provide a simple, highly accurate pressurized manometer that is easy to use, unaffected by foreign particles in the fluid, and one which does not require a secondary manometer fluid.

SUMMARY OF THE INVENTION

The present invention which will be described subsequently in greater detail comprises a manometer for measuring the velocity pressure of fluid flowing through a conduit. The manometer has a housing supporting an inverted, U-shaped tube with an upper curved portion having downwardly extending legs that terminate in a manifold providing passage means for connecting the manometer legs to the conduit. An air supply tube disposed within one of the legs has an upper end opening into the interior of the U-shaped tube at a point near the upper curved portion, while the other end of the air tube extends into the manifold for connection to a suitable pumping means for pressurizing the air within the manometer to balance against the conduit pressure. A pitot tube probe usable in conjunction with the manometer and a method of manufacturing the same are disclosed.

It is therefore a primary object of the present invention to provide a new and improved pressurized manometer adapted to measure the velocity pressure of a flowing fluid at selected positions along the length of a conduit.

It is also an object of the present invention to provide a new and improved pitot tube probe usable in conjunction with the manometer of the present invention and a method of manufacturing the same.

It is a further object of the present invention to provide a manometer and pitot tube probe which are simple in their design, easy and accurate to use and which are reliable and trouble free, in that they are unaffected by foreign particles in the fluid whose pressure is being measured.

Other objects, advantages and applications of the present invention will become apparent to those skilled in the art of manometers and pitot tube probes when the accompanying description of an example of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and in which.

DESCRIPTION OF THE PREFERRED EMBODIMENT

Figure 1:
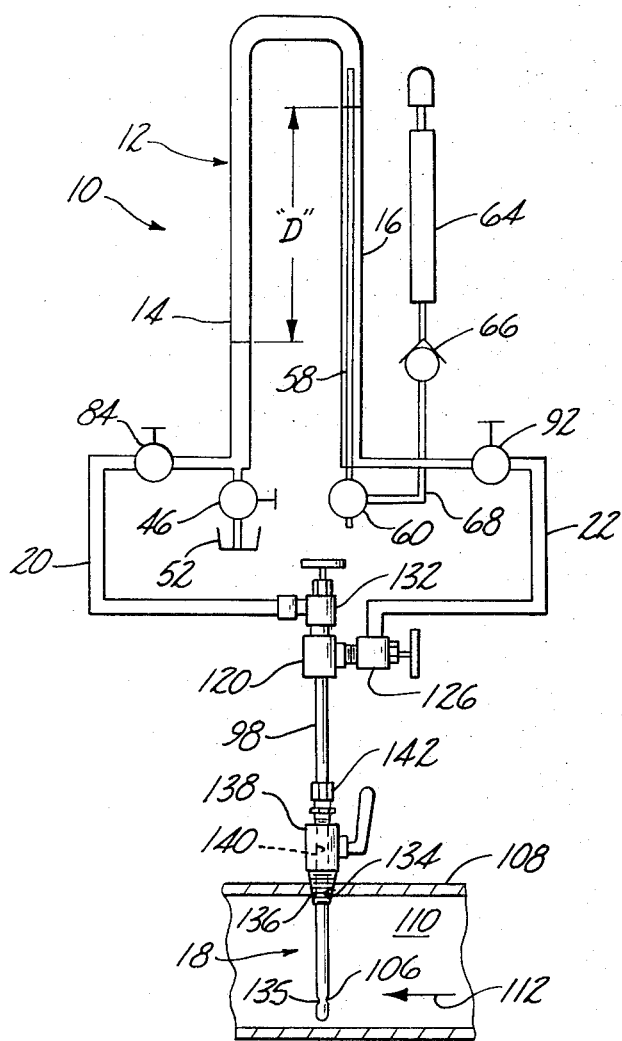
FIG. 1 is a schematic illustration of a system including a manometer and pitot tube probe constructed in accordance with the principles of the present invention.
Figure 2:
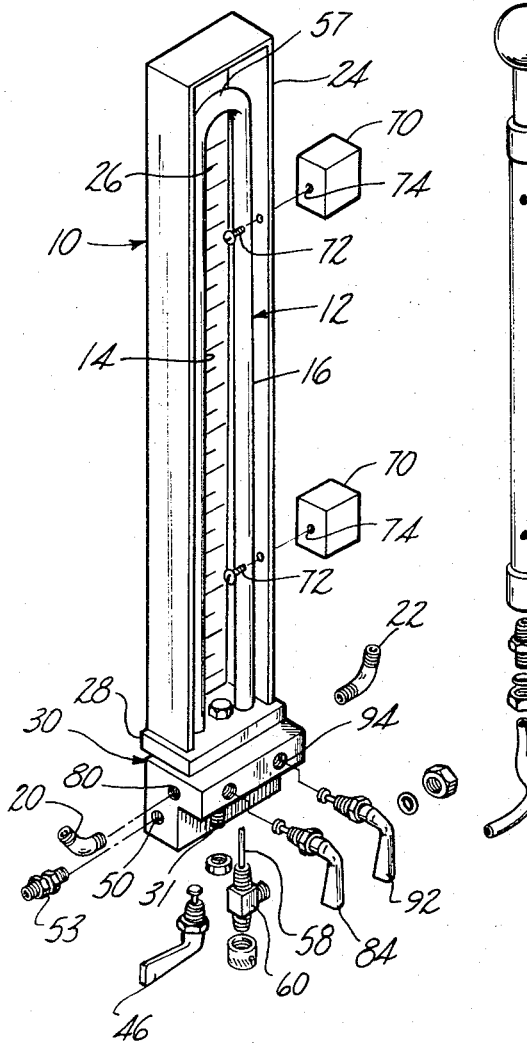
FIG. 2 is an exploded perspective view of the manometer schematically illustrated in FIG. 1.

Referring to the accompanying drawings and, in particular, to FIGS. 1 and 2 there is illustrated one example of the present invention in the form of a manometer system 10 comprising an inverted, differential, U-tube manometer 12 having downwardly extending legs 14 and 16 respectively connected to a pitot tube probe 18 by gauge lines 20 and 22. The manometer system 10 further comprises a protective metal housing 24 having one longitudinal side opened and exposing the inverted U-shaped tube manometer 12 while the opposite inner side wall of the housing 24 mounts an indicator scale 26 (FIG. 2) which is visible between the legs 14 and 16 in the conventional manner. The housing 24 terminates in a mounting base 28 which, in turn, is fixedly attached to a manifold block 30 by means of a threaded fastener 31.

The manifold block 30 which is L-shaped in cross section has a pair of bosses 32 and 34 formed on the upper surface of a laterally disposed leg 35. The bosses 32 and 34 are received within apertures in the mounting base 28 while a central mounting bore 36 (FIG. 5 and 6) extending through the mounting base 28 and the downwardly extending leg 38 of the mounting block 30 accommodates the fastening means 31, as aforementioned, which attaches the mounting base 28 to the manifold block 30. The boss 32 has a leg-receiving bore 42 terminating in a decreased diameter portion 44 (FIG. 6) forming a valve seat engageable by a drain toggle valve 46 (FIG. 2) mounted in a threaded port 48. The drain toggle valve 46 selectively controls communication between the leg-receiving bore 42 and a drain port 50 which, in turn, communicates the fluid within the manometer 12 to a reservoir 52 (FIG. 1) via drain line 53 (FIG. 2). As can best be seen in FIG. 6, the leg-receiving bore 42 supportably mounts the lower end of the downwardly extending tube leg 14.

The boss 34 also has a leg-receiving bore 54 which, similar to the bore 42, supports the lower end of the tube leg 16. The bore 54 terminates in a decreased diameter portion 56 forming a mounting means to support an air supply tube 58 that extends upwardly therefrom through the manometer leg 16 and terminates near the upper curved section 57 of the manometer tube 12. The lower end of the air supply tube 58 is received in an air bleed valve 60 that is mounted within a threaded bore 62 within the manifold block leg 38.

The air bleed valve 60 provides a means for the connection to a hand-operated charge pump 64 which is conventional in its structure having a check valve 66 at its outlet end to prevent the backflow of air. The hand-operated charge pump 64 is connected via suitable fitting and hose 68 and the air bleed valve 60 to the lower end of the air supply tube 58 so that pressurized air from the charge pump 64 may be directed through the air bleed valve 60 into the air tube 58, and thus into the interior of the manometer tube 12. The hand-operated charge pump 64 is mounted along one of the longitudinal side walls of the protective metal housing 24 by means of mounting blocks 70 and threaded fastening members 72 which extend through the side wall of the protective metal housing 24, through apertured bores 74 in the mounting blocks 70 and into threaded bores 75 in the wall of the charge pump 64.

Figure 5:
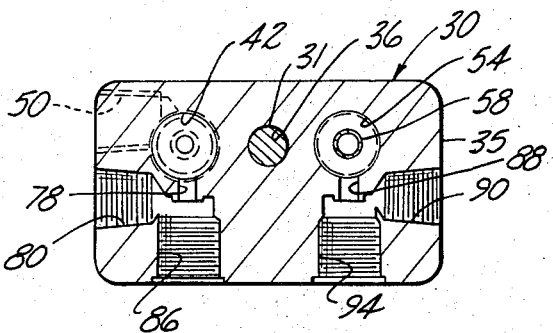
FIG. 5 is a fragmentary cross-sectional view of the manometer illustrated in FIG. 2 and taken along line 5—5 of FIG. 7.
Figure 6:
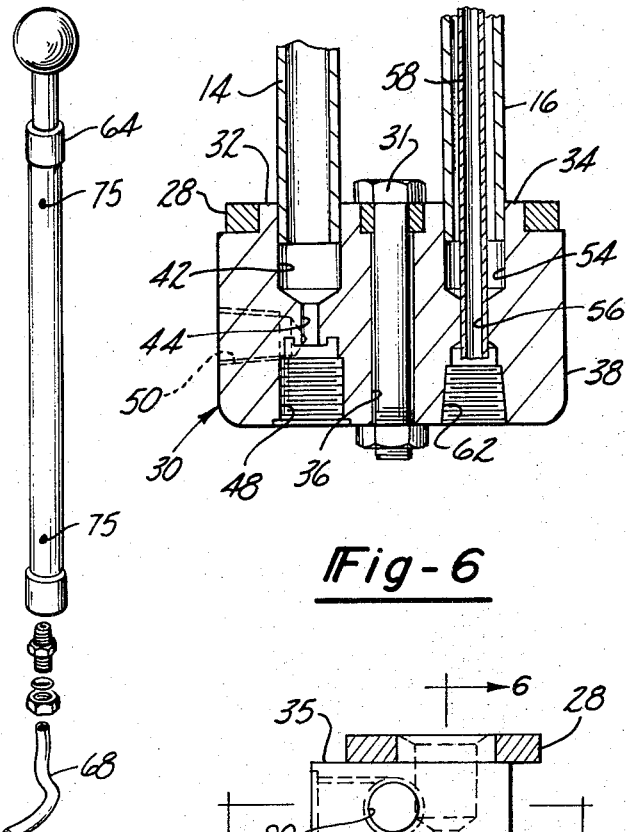
FIG. 6 is a fragmentary cross-sectional view of the manometer illustrated in FIG. 2 and taken along line 6—6 of FIG. 7.

As can best be seen in FIG. 5, the laterally disposed leg 35 of the manifold block 30 has a bore 78 communicating the leg-receiving bore 42 with a gauge line port 80 which, in turn, mounts the gauge line 20 FIG. 2. The bore 78 forms a valve seat engageable by a shutoff toggle valve 84 (FIG. 2) mounted in a threaded bore 86 FIG. 5.

Figure 7:
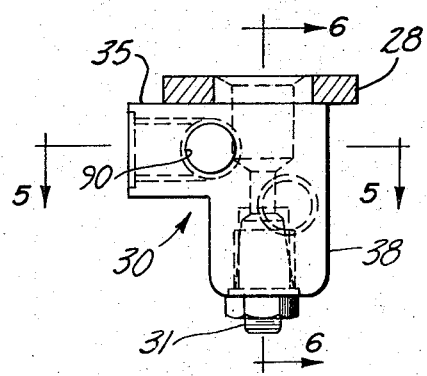
FIG. 7 is a fragmentary, side-elevational view of the manometer illustrated in FIG. 2.

The mounting block leg 35 also has a bore 88 connected to the leg-receiving bore 54 and provides communication between the bore 54 and a gauge line port 90 (FIGS. 5 and 7) with the bore 88 functioning as a valve seat engageable by a shutoff toggle valve 92 FIG. 2 mounted in a threaded port 94. The gauge line port 90 mounts the gauge line 22 and thus provides communication between the manometer leg 16 and the pitot tube probe 18 as will be described hereinafter.

Figure 4:
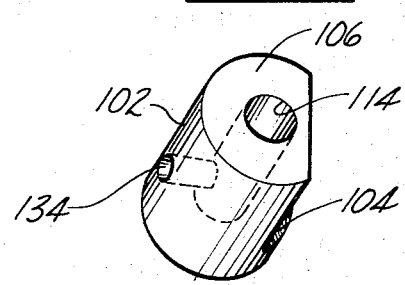
FIG. 4 is an enlarged, perspective view of an element of the pitot tube illustrated in FIG. 3.
Figure 3:
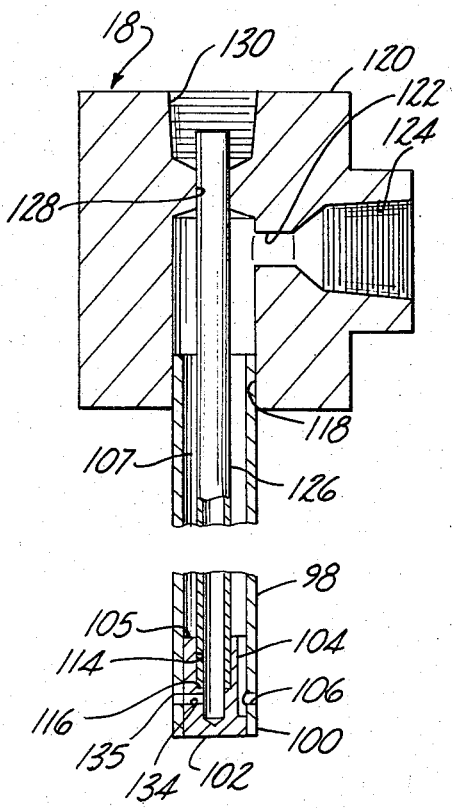
FIG. 3 is an enlarged, cross-sectional view through the pitot tube probe schematically illustrated in FIG. 1.

Referring now to FIGS. 1, 3 and 4, the pitot tube probe 18 is illustrated as comprising an outer, circular tubular member 98 having its lower end 100 enclosed by a manifold plug 102. The manifold plug 102, which is generally circular in shape, sealingly engages the inner periphery of the outer tubular member 98. The manifold plug 102 has a recessed portion 104 extending from its upper surface 105 downwardly a predetermined distance and terminating in communication with an opening 106 in the outer tubular member 98. The manifold plug 102 is further formed with a longitudinally disposed step bore 114 having an inner shoulder 116. The step bore 114 extends from the upper surface 105 of the plug 102 to a depth corresponding to the depth of the recess 104.

The opening 106 extends completely through the wall of the outer tubular member 98 and when the pitot tube is positioned within the conduit 108 in the position shown in FIG. 1, the opening 106 is adapted to face upstream so as to sense the total pressure of the fluid 110 as the same flows through the conduit 108 in the direction indicated by the arrow 112.

The outer periphery of the outer tubular member 98 is press fitted into an axial bore 118 of a pitot tube mounting block 120. The bore 118, in turn, communicates through a passage 122 with a threaded port 124. The threaded port 124 mounts a shutoff valve 126 (FIG. 1) which, in turn, selectively controls communication between the mounting block bore 118 and the gauge line 22 and thus the manometer leg 16.

The pitot tube probe 118 further comprises an inner tubular member 126 (FIG. 3) coaxially aligned with the outer tubular member 98 and having its lower end sealingly engaging the manifold plug axial bore 114. The lower end of the inner tubular member 126 abuts the bore shoulder 116 when the member 126 is fully inserted within the bore 114 of the plug 102. The upper end of the inner tubular member extends through a reduced diameter portion 128 of the mounting block bore 118 and terminates in a threaded port 130. The threaded port 130 mounts a second shutoff valve 132 (FIG. 1) which, in turn, selectively communicates the inner tubular member with the gauge line 20, and thus with the manometer leg 14. The upper end of the inner tubular member 126 sealingly engages the reduced diameter bore 128 to prevent fluid communication between the annular space 107 (formed between the outer tubular member 98 and the inner tubular member 126) with the interior of the inner tubular member 126.

After assembly of the manifold plug 102 within the outer tubular member and the assembly of the inner tubular member 126 within the axial bore 114 of the manifold plug 102, a lateral bore 134 is drilled completely through the outer tubular member wall and the manifold plug 102 into communication with the lower end of the axial bore 114. The outer opening 135 of the lateral bore 134 is located on the outer tubular member 98 in a diametrically opposed relationship to the opening 106 such that when the probe 18 is in the position shown in FIG. 1, the opening 135 faces downstream to sense the static pressure of the flowing fluid 110, which static pressure is transmitted through the lateral bore 134, the axial bore 114, the inner tubular member 126, the shutoff valve 132, the gauge line 20, the gauge port 80, the shutoff toggle valve 84, the passageway 78, the leg-receiving bore 42 and to the leg 14 of the manometer tube 12. At the same time the total pressure of the fluid 24 is transmitted through the opening 106, the annular space 107, the mounting block bores 118 and 122, the shutoff valve 126, the gauge line 22, the gauge line port 90, the shutoff toggle valve 92, the manifold block passages 88 and 54 to the manifold leg 16. The fluid rises up each leg 14 and 16 of the manometer 12 and forms in and of itself the indicating liquid of the manometer differential head; that is, the difference between the level of the fluid in each leg of the manometer 12 as indicated by the letter "D" (FIG. 1) is the velocity pressure of the fluid being measured. The pressure of the fluid communicated to the leg 14 of the manometer is the static pressure of the fluid 110 the total pressure of the fluid 110 is communicated to the leg 16 of the manometer 12. The total pressure is the sum of the static pressure and the pressure created by the impact of the fluid 110 against the pitot tube probe 18. The difference between the level of the fluid 110 in the legs 14 and 16, as indicated on the scale 26 of the manometer 12, for any given rate of flow of the fluid 110 within the conduit 108 will directly give the pressure due to impact, which pressure is commonly termed the velocity pressure. With the knowledge of the size of the conduit 108 and the velocity pressure, the actual velocity of the fluid 110 flowing through the conduit 108 may be calculated in a manner well known to those skilled in the art. The manometer system 10 is particularly adapted for use in measuring the velocity pressure of water as the interface between water and the air trapped within the manometer 12 is very definite, and thus providing an extremely accurate measurement of the static and total pressures.

The height of the trapped air columns within the upper U-shaped portion of the manometer 12 must be equal to or greater than the pressure differential to be read on the scale 26 to prevent the leg carrying the higher pressure from spilling over the top of the U-tube manometer 12 and being exhausted out the lower pressure leg. By pressurizing the air trapped within the manometer 12 by means of the hand-operated charge pump 64, any length of air column within the range of the manometer can be obtained to accommodate fluids at very high pressures or pressure differentials without the possibility of the fluid in one leg climbing over the U-shaped portion 57 of the manometer 12 and down the other leg. The bleed valve 60 is provided in conjunction with the hand-operated charge pump 64 to provide a means for reducing the pressure within the manometer 12 to any desired value to obtain a sufficient length of the air column for measuring the particular pressure differential (velocity pressure). The drain valve 46 in communication with the gauge line 20 is adapted to permit the purging of the manometer 12 and the gauge lines 20 and 22 of any air by permitting fluid from both gauge lines to exhaust to the atmosphere through the valve 46. The pressure generated by the hand-operated charge pump 64 forces fluid from the legs 14 and 16 back into the system until a sufficient air column height is obtained to measure the particular pressure differential (velocity pressure). The air pressure of the air trapped within the manometer 12 (height of the air columns) may be reduced to any desired pressure level by means of an air bleed valve 60.

Referring now to FIG. 1 the conduit 108 is illustrated as having a threaded bore 134 within which is disposed the threaded end 136 of a system shutoff valve 138. The end 136 of the shutoff valve 138 may be attached to the bore 136 by any suitable fastening means such as soldering, welding or a press fit. The valve 138 is normally maintained on the conduit 108 in a closed position when it is not desired to sense the pressure of the fluid 110 flowing therethrough at that location. Although only one valve 138 is shown, it is to be understood that the conduit 108 would have a plurality of valves 138 disposed along the entire length and circumference of the conduit 108 at selected intervals where it is desired to determine the velocity profiles of the fluid 110. As shown in FIG. 1, the valve 138 is provided with a longitudinal internal passage 140 through which the pitot tube probe 18 is adapted to be inserted when the valve 138 is opened. The pitot tube probe 18 is positioned within the conduit 108 such that the opening 106 faces upstream while the diametrically opposed opening 135 faces downstream whereby the openings 106 and 135 respectively are in a position to sense the total and static pressures of the fluid 110. A fitting 142, located at the top of the valve 138, is adapted to be received in the internal passageway 140. The fitting 142 functions to insure a fluid tight seal between the pitot tube probe 18 and the passageway 140 and to restrain the probe 18 from further axial movement with respect to the valve passageway 140 once the probe 18 has been properly positioned within the conduit 108.

After the pitot tube probe 18 is inserted and the gauge lines 20 and 22 are connected in the manner illustrated, the shutoff valves 126 and 132 and the shutoff toggle valves 84 and 92 are opened whereby the fluid 108 at total and static pressures are transmitted, respectively, to the manometer legs 16 and 14. After the manometer 12 has been purged and pressurized as hereinbefore described, the fluid 110 will rise in each leg of the manometer to levels which are indicative of the static and total pressures. The difference "D" between the level of the fluid in each leg, as indicated on the scale 26, will be the velocity pressure of the fluid 110 flowing through the conduit 108, which velocity pressure may be translated into the actual velocity of the fluid 110 from conventionally available charts.

After a pressure measurement has been observed at one location along the length of the conduit 108, the fitting 142 may be loosened to permit a repositioning of the openings 106 and 134 at selected radial locations in a plane transversely disposed with respect to the direction of flow of the fluid 110 and thus enabling the operator to make several pressure measurement observations to obtain a point-to-point velocity profile of the fluid at that one location. The ability to move the pitot tube probe axially within the valve passageway 140 provides a very simple means of obtaining an accurate and detailed description of the velocity characteristics of the flowing fluid 110.

Once the desired pressure readings have been obtained at a particular location, the toggle and shutoff valves are closed and the fitting 142 of the system shutoff valve 138 is loosened to permit a withdrawal of the pitot tube probe 18 from within the conduit 108 whereupon the shutoff valve 138 is closed to prevent further fluid from flowing therethrough after withdrawal of the probe 18. The probe 18 may then be moved to the next location along the length of the conduit 108 wherein the flow rate of the fluid 110 is desired to be measured. The valve 138 associated with the next location is opened and the probe 18 inserted therethrough and into the conduit 108 whereupon the fitting 142 associated with the next valve 138 is tightened down. The air pump 64 is then utilized to purge the lines and pressurize the air within the manometer 12 in the manner aforementioned.

It can thus be seen that the present invention has provided a manometer and pitot tube probe which are extremely simple and reliable in design and which are highly accurate in sensing the velocity characteristics of a fluid passing through a conduit, while at the same time the manometer and pitot tube probe have no moving parts which would be affected by foreign particles carried by the fluid, and thus the system is highly reliable.

It can also be seen that the present invention has disclosed a new and improved method of fabricating a pitot tube probe.

It can further be seen that the present invention has provided a manometer having a manifold block which permits the easy connection of the manometer tube to various valves, gauge lines and other accessories needed to operate the manifold in the desired manner.

Although only one form of the present invention has been disclosed, it should be understood by those skilled in the art of manometers and pitot tube probes that other forms may be had all coming within the spirit of the invention and the scope of the appended claims.

What is claimed is as follows:

1. The manometer for measuring the velocity pressure of a fluid flowing through a conduit, said manometer comprising:
    a housing;
    a hollow, inverted, U-shaped tube having an upper curved section with downwardly extending legs, said U-shaped tube being carried by said housing, said legs being selectively and separately communicable with said fluid conduit;
    an air supply tube disposed within one of said legs and having an upper end opening into the interior of said U-shaped tube at a point near said upper curved section, the other end of said air tube extending from the end of said one leg and mounted in such a fashion that the air passage defined by the interior of said air tube does not communicate with said fluid conduit; and
    pumping means connected to said other end of said air tube for pressurizing air within said manometer.

2. The manometer defined in claim 1 further comprising:
    a probe for connecting said U-shaped tube legs to said fluid conduit, said probe comprising an outer tubular member having first and second diametrically opposed openings at one end of said outer tubular member;
    a plug having a lower base section with an outer periphery complementary with the inner wall surface of said outer tubular member and insertable in said one end of said outer tubular member over said first and second openings in a fluid sealing relationship, said plug having an L-shaped bore with one end opening at the upper end of said plug and communicating with the interior of said outer tubular member and the other end of said L-shaped bore terminating at said first opening;
    an inner tubular member extending downwardly within said outer tubular member and received in a fluid sealing engagement within said one end of said L-shaped bore, said plug having a second bore communicating said second opening to the annular space formed between the outer periphery of said inner tube member and inner periphery of said outer tubular member;
    first passage means fluidly connecting said inner tubular member to one of said U-shaped legs; and
    second passage means connecting said annular space to the other of said U-shaped tube legs.

3. The manometer defined in claim 2 wherein said probe is insertable within said conduit and one of said openings is adapted to face upstream for sensing the total pressure of said conduit fluid and communicating said fluid at said total pressure to said one manometer leg, while the other of said openings in said outer tubular member is adapted to face downstream for sensing the static pressure of the said conduit fluid and communicating said fluid at static pressure to the other of said manometer legs.

4. The manometer defined in claim 1 further comprising a manifold carried by said housing, said manifold having first and second longitudinal bores, the ends of said U-shaped manometer legs being respectively received in said first and second bores in a fluid sealing relation, first and second port means laterally disposed with respect to said first and second bores for respectively communicating said first and second bores to said fluid conduit;
    a third bore in axial alignment with one of said manifold bores, said air tube being disposed in said third bore in a fluid sealing engagement and extending upwardly therefrom through said one manifold bore and into the interior of the U-shaped manometer leg associated therewith;
    valve means disposed in said third bore for selectively controlling communication between said air tube and said pumping means; and
    second valve means disposed in said first and second bores for selectively controlling communication between said manometer legs and said fluid conduit.

5. A manometer probe comprising:

an outer tubular member having first and second diametrically opposed openings at one end of said outer tubular member;

a plug having a lower base section with an outer periphery complementary to the inner wall surface of said outer tubular member and insertable in said one end of said outer tubular member over said first and second openings in a fluid sealing relationship, said plug having an L-shaped bore with one end opening at one end of said plug and communicating with the interior of said tubular member, the other end of said L-shaped bore terminating at said first opening;

an inner tubular member extending downwardly within said outer tubular member and received in a fluid sealing engagement within said one end of said L-shaped bore, said plug having a second bore for communicating said second outer tubular member opening with the annular space formed between the outer periphery of said inner tubular member and the inner periphery of said outer tubular member.

6. A system for measuring the velocity pressure of a fluid flowing through a conduit said system comprising:

a probe adapted to be positioned within said conduit, said probe having a first passage opening into said conduit for sensing the static pressure of said fluid flow and a second passage opening into said conduit for sensing the total pressure of said fluid flow;

an inverted U-tube manometer having an upper curved section with downwardly extending legs;

passage means for connecting said first probe passage with one of said manometer legs and said second probe passage with the other of said manometer legs;

air supply tube means disposed within one of said legs and having an upper end opening into the interior of said U-tube at a point near the upper curved section thereof, the other end of said tube extending from the lower end of said legs and mounted in such a fashion that the air passage defined by the interior of said air supply tube does not communicate with the probe passage associated with said one leg; and pumping means connected to said other end of said tube means for pressurizing the air within said U-tube.

7. The manometer defined in claim 6 wherein said probe comprises an outer tubular member having first and second diametrically opposed openings at one end of said outer tubular member;

a plug having a lower base section with an outer periphery complementary with the inner wall surface of said outer tubular member and insertable in said one end of said outer tubular member over said first and second openings in a fluid sealing relationship, said plug having an L-shaped bore with one end opening at the upper end of said plug and communicating with the interior of said outer tubular member and the other end of said L-shaped bore terminating at said first opening;

an inner tubular member extending downwardly within said outer tubular member and received in a fluid sealing engagement within said one end of said L-shaped bore, said plug having a second bore communicating said second opening to the annular space formed between the outer periphery of said inner tube member and inner periphery of said outer tubular member;

said passage means fluidly connecting said inner tubular member to one of said U-shaped legs; and said annular space to the other of said U-shaped tube legs.

8. The manometer defined in claim 9 wherein said probe is insertable within said conduit and one of said openings is adapted to face upstream for sensing the total pressure of said conduit fluid and communicating said fluid at said total pressure to said one manometer leg, while the other of said openings in said outer tubular member is adapted to face downstream for sensing the static pressure of the said conduit fluid and communicating said fluid at static pressure to the other of said manometer legs.

* * * * *